June 28, 1960 R. BELL 2,942,811
AIRPLANE WITH SIGHTSEEING LOUNGE FLOOR
Filed Jan. 21, 1958
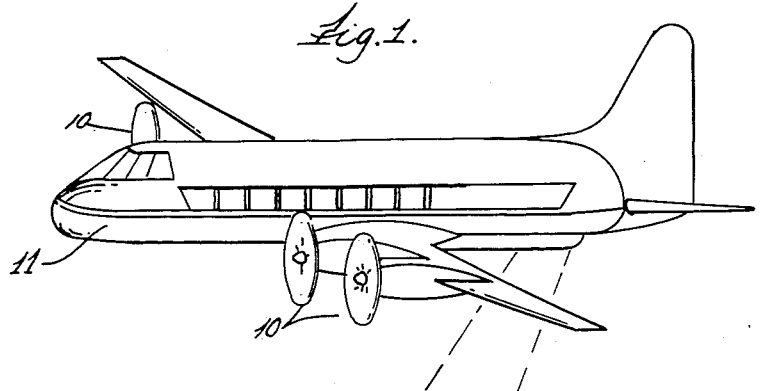
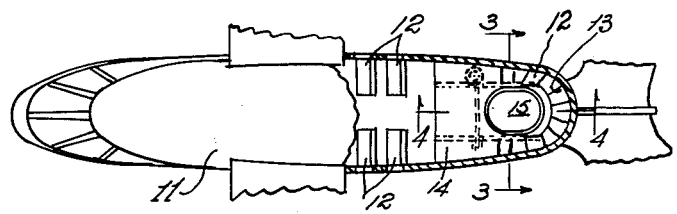
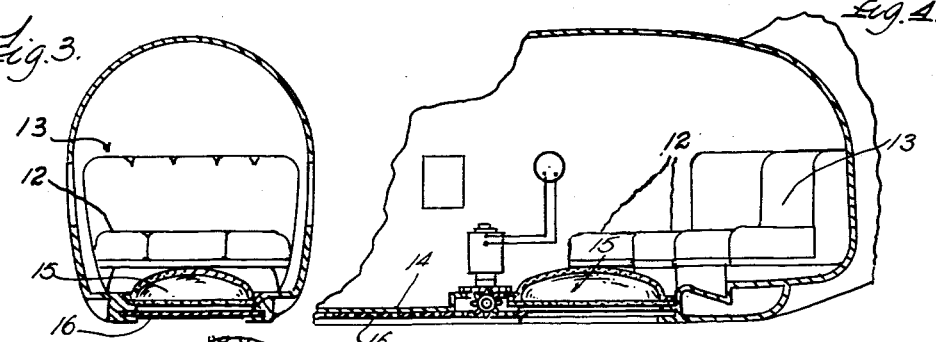
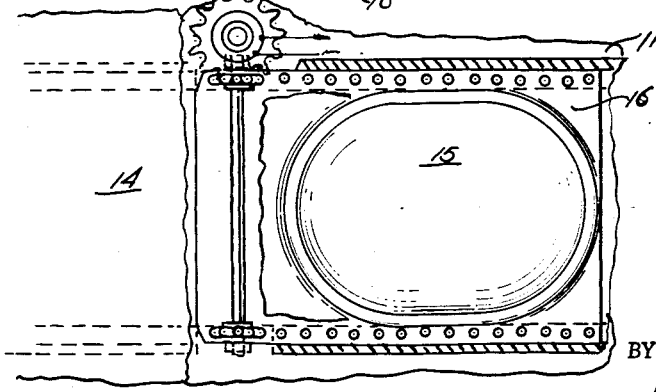
INVENTOR.
Robert Bell,
BY James R. McKnight
Attorney.

United States Patent Office 2,942,811
Patented June 28, 1960

2,942,811

AIRPLANE WITH SIGHTSEEING LOUNGE FLOOR

Robert Bell, 211 Kenlyn Road, Palm Beach, Fla.

Filed Jan. 21, 1958, Ser. No. 710,277

1 Claim. (Cl. 244—118)

My invention relates to an airplane having a glass floor in its lounge for the sightseeing of passengers.

Among the objects of my invention are to provide and airplane having a lounge with a domed glass floor, so that passengers may see the country and objects over which the plane is flying. In this way, famous sights best viewed by air may be seen and enjoyed. For example, Victorial Falls in Africa, only seen in its entirety by air may be seen through the window in my lounge. Other famous and beautiful sights and vistas are made available for viewing and enjoyment through my transparent lounge floor. My viewing is positioned for maximum effect, comfort and enjoyment in a plane. My glass is protected by a slidable covering.

My invention also comprises such other objects, advantages and capabilities as will later more fully appear and which are inherently possessed by my invention.

While I have shown in the accompanying drawings a preferred embodiment of my invention, yet it is to be understood that the same is susceptible of modification and change without departing from the spirit of my invention.

Referring to the drawings, Fig. 1 is a perspective view of my plane in flight; Fig. 2 is a top plan view of my plane in section and partly broken away; Fig. 3 is an enlarged sectional view on line 3—3 of Fig. 2; Fig. 4 is an enlarged detailed sectional view on line 4—4 of Fig. 2; and Fig. 5 is a broken plan view of the floor of my plane showing the domed glass and the protective covering.

Heretofore sightseeing from a plane has been limited to cramped short views obtained from side windows. The vision is sometimes confined by the awkwardness of the position of the viewer at the windows in flight. Often the wings or motors block the view. With my construction, I provide an unobstructed view of the ground and objects below over which the plane is flying. The viewer is seated in perfect comfort and his view is not distorted, interrupted, or cramped. For the first time the airlines will be able to provide superb views of the famous places flown over to those passengers vitally interested in sightseeing. It opens up a new asset with a minimum of expense to the airlines.

In the current airplane, there are the usual motors 10 attached to a body 11 forming an enclosure within which are seats 12 for the passengers. At the rear of the body is a lounge 13 in the general shape of a horseshoe, with seats 12 on the rear and sides of the lounge floor 14. In combination with the foregoing, the embodiment selected to illustrate my invention comprises providing the floor of the lounge 14 with a transparent glass portion 15 preferably domed to provide increased visibility. A covering 16 of steel or other strong material is slidably mounted on the body 11 and adapted to be moved to cover and protect the glass portion 15 when the plane is not in flight, and to be moved away from the glass portion 15 to expose the same for use. My covering 16 is preferably operable electrically by connection with the electrical system of the plane and a suitable motor.

While my transparent glass portion is particularly desirable for a lounge of a plane, yet it may be placed along the aisle of a plane so as to provide visibility for aisle seat passengers. That would make the aisle seat more desirable to passengers than a window seat.

In those current airplanes in which there is a baggage compartment located below the floor of the plane, I provide a transparent glass portion 15 set in the bottom of the compartment just below the lounge 13 or other portion of the floor chosen. In this construction this portion of the baggage compartment would be partitioned off and not used for baggage so that there would be no visibility through a glass 15 in the floor 14 of the plane and the glass 15 in the bottom of the baggage compartment.

Having thus described my invention, I claim:

In an airplane having a body and seats with a floor and lounge in the rear of the body, a transparent window set in the floor of the lounge, a plurality of seats positioned in said lounge adjacent said transparent window to provide passengers in comfort from their seats with unobstructed sightseeing views directly below said window of the objects and terrain over which the plane flies, said transparent window having an inwardly curved dome for increasing the visibility, and a single protective shatterproof covering slidably mounted on said body adjacent said window, and a motor adapted to move said covering to cover said window, and also adapted to move said covering away from said window to expose the same for sightseeing.

References Cited in the file of this patent

UNITED STATES PATENTS

| | | |
|---|---|---|
| 2,201,249 | Tormollan | May 21, 1940 |
| 2,314,949 | Palmer | Mar. 30, 1943 |
| 2,650,780 | Northrop et al. | Sept. 1, 1953 |

FOREIGN PATENTS

| | | |
|---|---|---|
| 433,256 | Italy | Apr. 5, 1948 |